C. B. WILLIAMS.
OPERATING MECHANISM FOR TRACTORS.
APPLICATION FILED OCT. 24, 1916.
1,230,637.
Patented June 19, 1917.
5 SHEETS—SHEET 1.
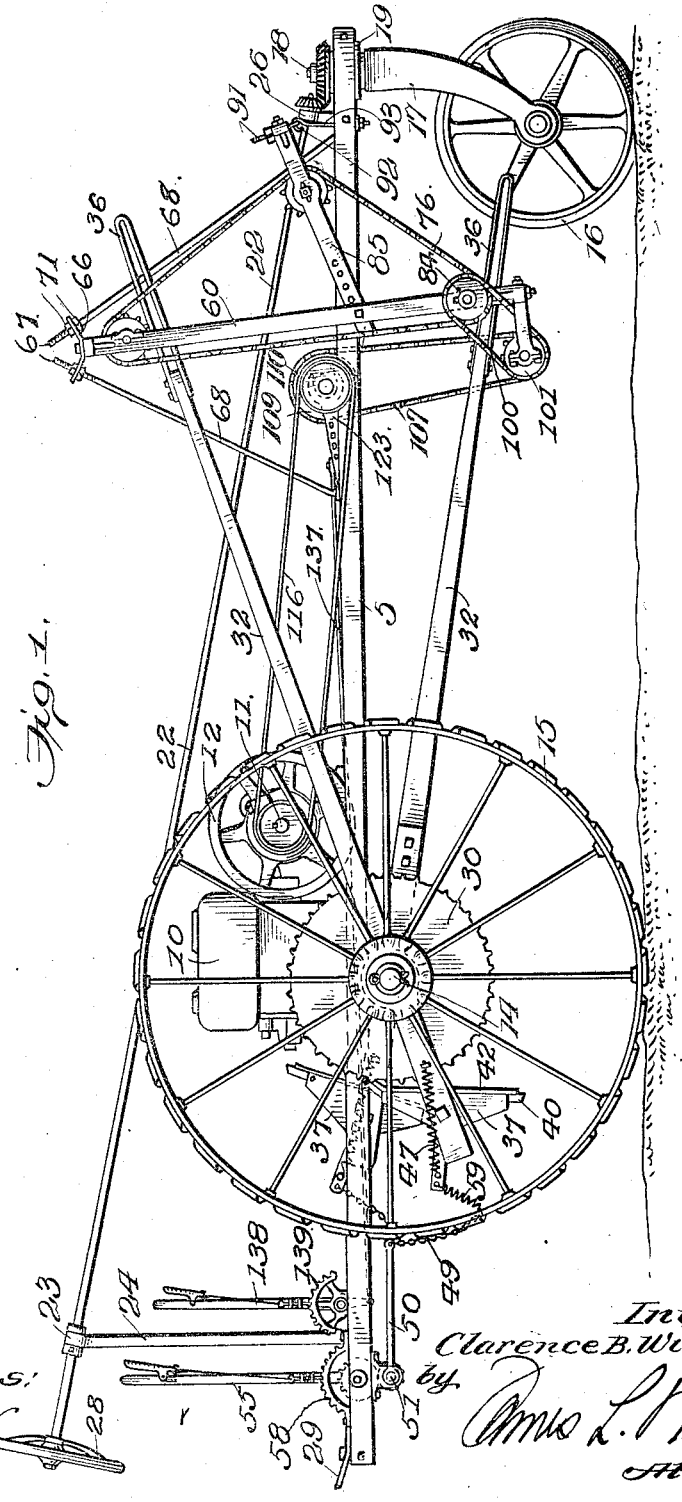

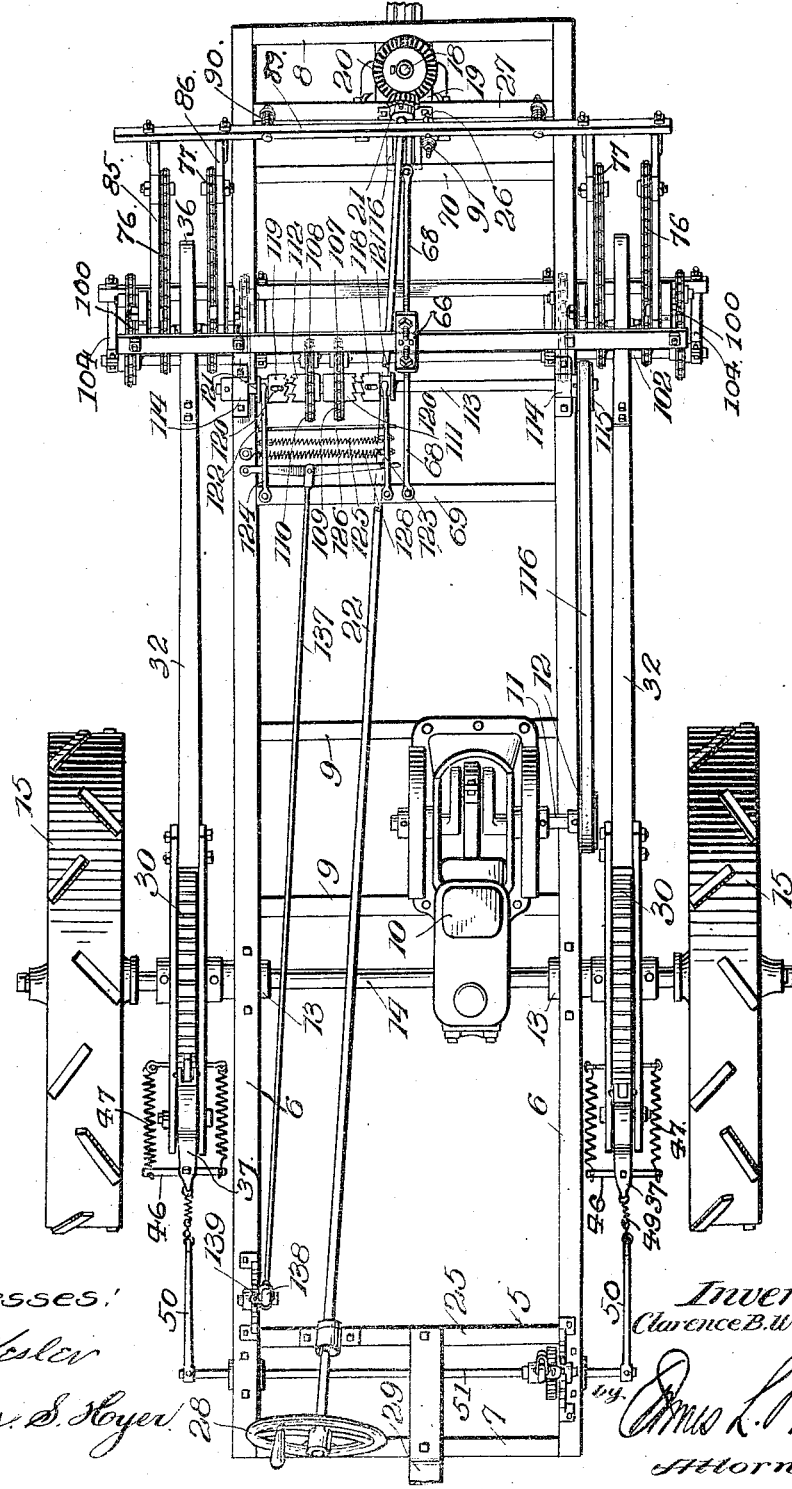

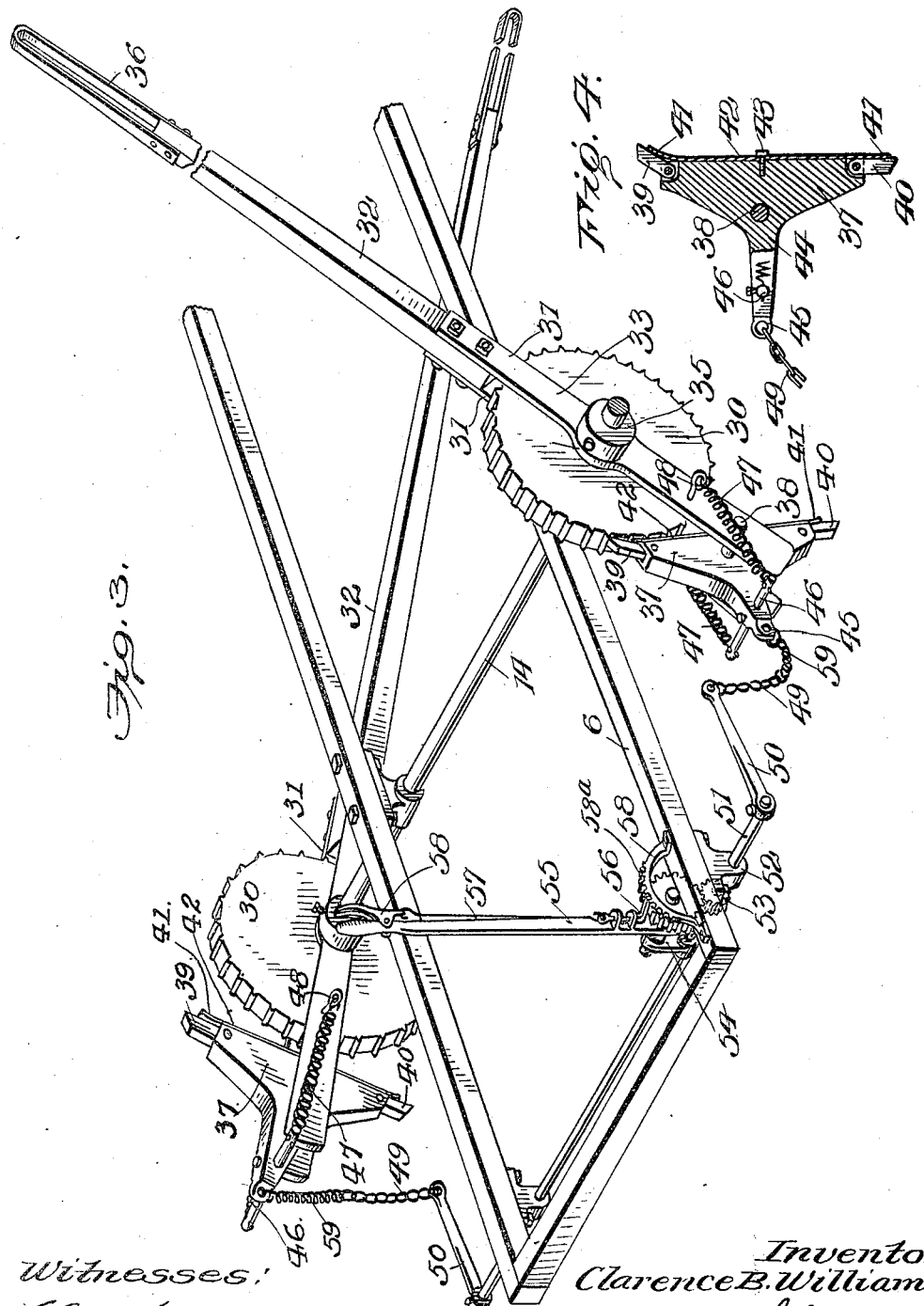

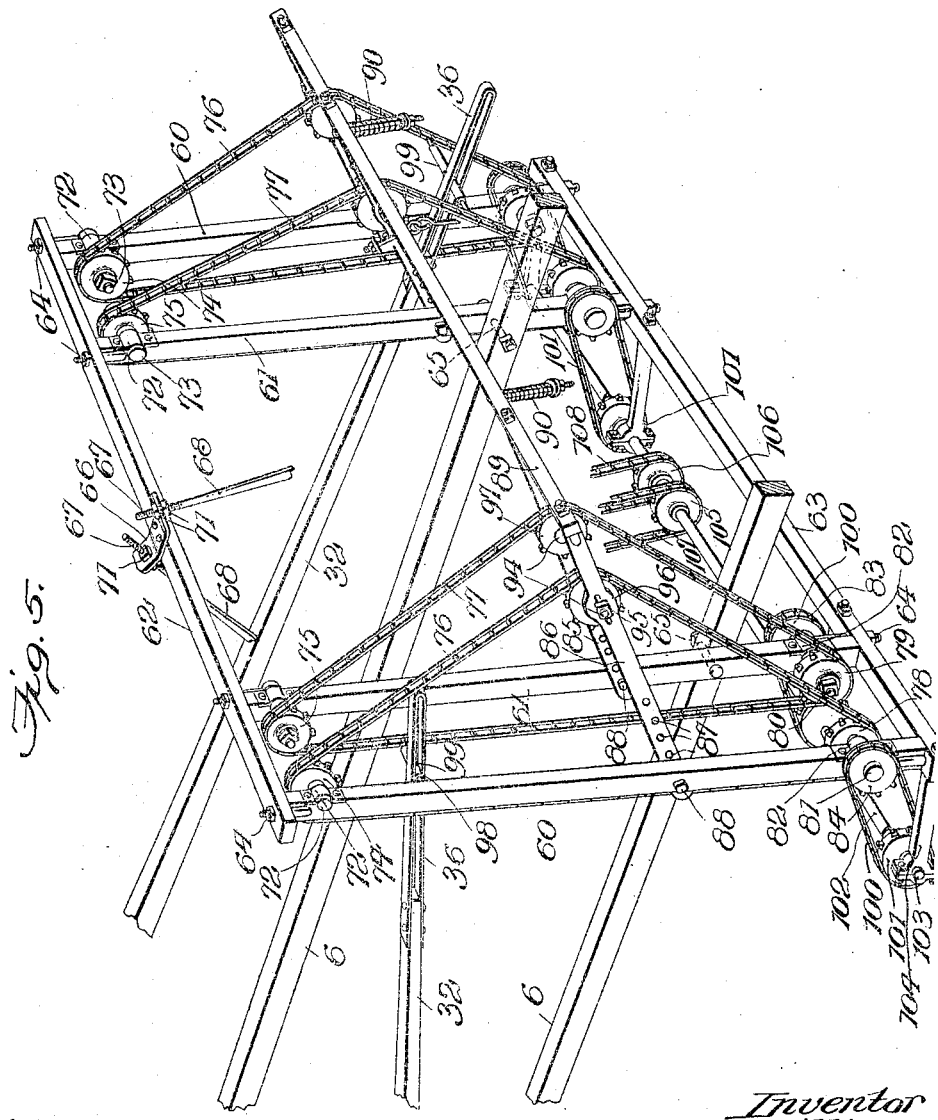

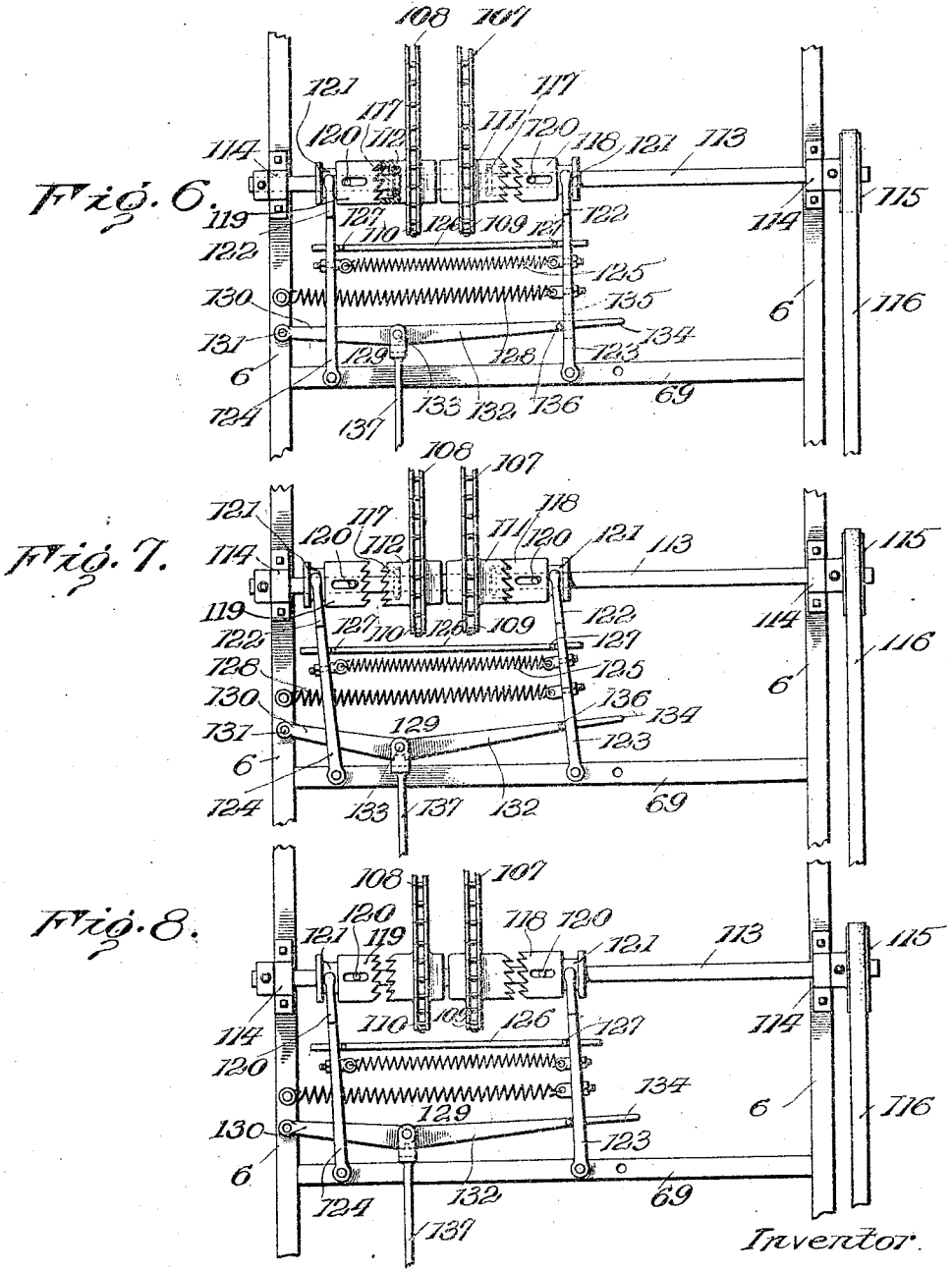

UNITED STATES PATENT OFFICE.

CLARENCE B. WILLIAMS, OF KEYSTOWN, SASKATCHEWAN, CANADA.

OPERATING MECHANISM FOR TRACTORS.

1,230,637.   Specification of Letters Patent.   Patented June 19, 1917.

Application filed October 24, 1916. Serial No. 127,442.

*To all whom it may concern:*

Be it known that I, CLARENCE B. WILLIAMS, a citizen of the United States, residing at Keystown, in the Province of Saskatchewan, Dominion of Canada, have invented certain new and useful Improvements in Operating Mechanism for Tractors, of which the following is a specification.

This invention relates to power mechanism involving both power generation and motion conversion for general application, but particularly adapted in the present instance to a traction engine; and the primary object of the same is to provide means for increasing the given power of a steadily running prime motor relatively to the main driving shaft or axle of the traction engine through the medium of a particular arrangement of sprocket wheels and chain belts to which the prime motor is connected. The present invention embodies an improvement in general construction and efficiency on the mechanism disclosed by my U. S. Patent No. 1,189,026, dated June 28, 1916, and constitutes a particular adaptation of the essential features of the patented mechanism and the improvements comprised therein to a traction engine. The present improvements also embody means between the chain belts and the power receiving element or drive shaft or axle whereby the increased power generated may be transmitted to the said axle. In the present instance also the chain belts are disposed in pairs in parallel relation with an intervening space between them and devoid of toothed gearing between them as a unifying movement means in order to entirely eliminate friction and lost motion incident to such gearing. The improved mechanism also embodies novel forms of various elements or parts and adjustments thereof as well as devices for disconnecting certain of the mechanisms to accomplish to the best advantage the function sought and to effectively and practically operate a traction engine.

Other objects and advantages will be hereinafter specified, together with the construction and arrangement of parts involving the features of the improvement.

In the drawings:

Figure 1 is a side elevation of a traction engine frame and wheels without the usual superstructure of devices of this class illustrating the features of the invention.

Fig. 2 is a top plan view of the same.

Fig. 3 is a detail perspective view of a portion of the frame or bed of the traction engine particularly showing the levers and ratchet mechanism for operating and imposing increased power on the drive shaft or axle relatively to the power of the prime motor for actuating the said levers.

Fig. 4 is a detail sectional elevation of one of the swinging pawl shoes which coöperates with the one ratchet wheel on the drive shaft or axle.

Fig. 5 is a detail perspective view of a forward portion of the frame particularly showing the manner of mounting and operating the pairs of chain belts and the operation of these belts from the prime motor.

Fig. 6 is a top plan view of a part of the mechanism and particularly showing the clutch devices coöperating with the motion transmitting shaft interposed between the prime motor and the pairs of chain belts and whereby the operation of the latter and the movement of the traction engine may be readily controlled.

Figs. 7 and 8 are views similar to Fig. 6 showing a different position of the clutch devices.

The numeral 5 designates a frame constituting a base support for the mechanism which will be hereinafter described and comprising side beams 6 connected by end beams 7 and 8. At an intermediate point the frame 5 is provided with a pair of cross-beams 9 on which a prime motor 10 is mounted, said motor being of any preferred form and having a shaft 11 carrying a pulley 12. The side beams 6 at points slightly in rear of the prime motor 10 are provided with suitable bearings or boxes 13 in which a drive shaft or axle 14 is mounted to rotate, said shaft or axle having traction wheels 15 of any preferred type on opposite ends thereof. At the front end of the frame 5 adjacent to the front cross-beam 8 a steering wheel 16 is mounted in the lower end of a steering post 17 having a spindle 18 rising therefrom and mounted in a suitable bearing 19 at the front end of the frame. On the upper end of the spindle 18 slightly above the plane of the frame 5 a bevel gear 20 is keyed, and meshing therewith is a bevel pinion 21 secured to the front end of a steering rod 22 extending rearwardly at an upward angle of inclination to the rear of the frame and rotatably disposed on a bearing 23 on an upright 24 rising from a cross beam or bar 25 at the rear extremity of the frame 5. The front end of the steering rod 22 is also mounted in a bearing 26 held by a front cross beam or bar 27. The rod 22 is also slightly deflected relatively to the longitudinal center of the frame 5 and has on its upper rear end a steering wheel 28 which is within easy reaching distance of a spring seat 29 which is adapted to be supported by the rear cross beam 7 and adjacent beam 25, said seat being only partially shown in Figs. 1 and 2 and of any preferred form of device of this character. By means of the rod 22 and wheel 28, together with the gearing 21 and 20 and the spindle 18 and post 17, the wheel 16 may be readily turned either to the right or left to guide the machine as may be desired during the propulsion thereof.

On opposite extremities of the drive shaft or axle 14 inside of the traction wheels 15, ratchet wheels 30 are keyed, and embracing each ratchet wheel is the rear bifurcated extremity 31 of a power transmitting lever 32, the rear bifurcated extremity 31 comprising spaced arms 33 secured at their front extremities to the body of the lever 32 and having intermediate bearings 35 mounted to swing on the axle 14, each arm 33 being held up close to the ratchet wheel 30 by a set collar 35 engaging the axle respectively at the outer and inner sides of the outer and inner arms 33. The forward extremity of each lever 32 is provided with an elongated slide loop 36 for a purpose which will be presently explained. Between the arms 33 of each lever a shoe 37 is mounted to rock, each shoe having trunnions 38 extending outwardly from the opposite sides thereof and through the rearwardly projecting extremities of the arms 33. Each shoe, as clearly shown by Fig. 4, carries pawls 39 and 40 in the upper and lower ends thereof which are engaged by the free extremities 41 of a plate spring 42 intermediately secured to the front edge of the shoe 37, as at 43, the pawls 39 and 40 being adapted to alternately engage the teeth of the ratchet wheel 30 adjacent to which the shoe with its pawl is mounted. These shoes 37 with their pawls 39 and 40 provide double acting pawl elements which coöperate with each ratchet wheel 30, and the object of this arrangement is to provide for both forward and rearward movements of the traction engine. Each shoe 37 has a centrally disposed rearwardly projecting shank 44 terminating in an eye 45, and extending transversely through this shank is a cross or yoke bar 46 having the rear ends of springs 47 secured to opposite extremities thereof and to eyes 48 projecting outwardly from the arms 33 in advance of the shoe. A chain or other similar flexible connection 49 is secured at one end to the eye 45 and at its opposite end to an arm 50 secured on the end of a crank shaft 51 mounted in bearings 52 depending from the lower rear portion of the frame 5. The crank shaft 51 and the shoes 37 at opposite sides of the machine are similarly constructed and connected so that the operative positions of the two shoes 37 may be readily changed to effect either a forward or rearward movement of the machine or traction engine. The crank shaft 51 is operated through the medium of a pinion 53 secured thereon and engaged by a gear 54 secured to the lower end of and movable with a shifting lever 55 having its lower end with the gear 54 pivotally connected to the adjacent side beam 6 of the frame 5. The lever 55 carries a dog 56 operated by a pull-rod or analogous device 57 extending upwardly to a lever 58 pivotally mounted on the upper extremity of the lever 55 as in the usual form of shifting levers, the dog 56 being disposed to engage a toothed segment 58$^a$ to maintain the adjustment of the shaft 51 and its arms 50. The chains or flexible connections 49 are given a yielding movement relatively to the rear ends of the shanks 44 of the shoes 37 by interposing springs 59 between said chains or flexible connections and the eyes 45 so that when the shoes are adjusted to bring the opposite pawls or dogs 39 and 40 into engagement with the ratchet wheels 30 jerking movements relatively to the shoes will be avoided. The ratchet and pawl mechanism, together with the particular association thereof with the levers 32 as just explained, constitute one of the features of the improvement and as hereinbefore indicated provide for either forward or rearward movements of the traction engine by the adjustment of the shaft 51 and its arms 50 through the medium of the shifting lever 55 and the connections thereof relatively to the said shaft. The springs 47 serve to keep the pawls or dogs 39 and 40 in engagement with their ratchet wheels 30, and while the said springs are in the position shown or above the axis or the trunnions 38 of the shoes 37 the upper pawls or dogs 39 will be held in positive engagement with the teeth of the ratchet wheels 30 or until the arc of movement of the rear extremities of the arms 33 is such as to clear the said upper pawls or dogs from the ratchet teeth, as shown by Fig. 3. However, there will always be one of the pawls or dogs 39 in engagement with the teeth of its ratchet wheel, that is, the pawl organization at opposite sides of the machine or traction engine will alternately engage the teeth of the ratchet wheels, and when one pawl or dog is disengaged from its ratchet wheel the other pawl or dog will be in engagement with the ratchet wheel provided for operation thereby. By adjusting the shifting lever 55 and correspondingly moving the shaft 51 and arms 50 the shoes 37 will be thrown over, or the upper pawls or dogs 39 will be thrown out of the plane of engagement with relation to the ratchet wheels 30 and the lower pawls or dogs 40 will be disposed in such positions as to engage the teeth of the ratchets, and under the latter condition the springs 47 will be below the axis or trunions 38 of the shoes 37 and will then operate to positively hold the pawls or dogs 40 in engagement with the teeth of the ratchet wheel below the plane of the driving shaft or axle 14 and a rearward or reverse movement of the machine or traction engine will result. The pawl or dog organizations may be quickly changed from one position to another as conditions of travel of the machine or traction engine may require.

An increased power generating organization is mounted on the forward extremity of the frame 5 at a point in rear of the position of the steering wheel 16, said increased power generating organization being essentially the same in construction and arrangement of parts as the power increasing organization disclosed by my patent hereinbefore noted, with certain features of improvement which will be particularly explained. The improved power increasing organization is clearly shown by Fig. 5 and comprises opposite pairs of uprights 60 and 61 secured at their upper and lower ends to cross-bars 62 and 63, the ends of the pairs of uprights 60 and 61 being secured to the cross-bars by bolts and nuts 64. The pairs of uprights 60 and 61 project below the side beams 6 of the frame 5, but are mainly extended above the said side beams, the inner uprights 61 of each pair being connected to the side beams 6 by fulcrum bolts 65 so that the power increasing attachment as a whole is mounted to swing on the forward extremity of the frame of the machine for adjustment purposes, and to maintain the adjustment of this attachment a brace strap 66 is secured to the center of the upper cross-bar 62 and has the upper screw-threaded ends 67 of brace rods 68 engaging the opposite extremities thereof and extending downwardly and connected to the centers of cross-beams 69 and 70 terminally attached to the side beams 6 of the frame 5, as clearly shown by Fig. 2. The upper screw-threaded ends or extremities 67 of the brace rods 68 are engaged by nuts 71 whereby the adjustment of these rods may be positively maintained and at the same time the frame of the power increasing attachment, which comprises the pairs of uprights 60 and 61 together with the attachments and mechanism carried thereby will be held in positive position, but at any time desired and found necessary this frame with the mechanism carried thereby may be shifted on the fulcrum bolts 65 either forwardly or rearwardly, though in either case the adjustment will be slight for a purpose which will be more fully hereinafter explained. This adjustment of the frame comprising the uprights 60 and 61 and the cross-bars 62 and 63 will be for the purpose of properly setting the frame and the mechanism carried thereby relatively to the mechanisms on the rear part of the main frame as hereinbefore explained. In suitable bearings 72 on the upper portions of the uprights 60 and 61 stub shafts 73 are mounted, said shafts, having their ends projecting inwardly toward each other and spaced apart and respectively carrying sprocket wheels 74 and 75, the said sprocket wheels operating as guides or direction means for chain belts 76 and 77 trained thereover and also engaging lower sprocket wheels 78 and 79 carried by short or stub shafts 80 and 81 journaled in suitable bearings 82 on the lower portions of the uprights 60 and 61. Both pairs of uprights are similarly equipped with these sprocket wheels and shafts, and the lower short or stub shafts 80 and 81 respectively extend inwardly beyond the inner uprights 61 and the outer uprights 60 and have thereon drive sprocket wheels 83 and 84. Supported in advance of the frame including the uprights 60 and 61 and cross-bars 62 and 63 is a supplemental tension frame comprising opposite pairs of end bars 85 and 86 having a plurality of apertures 87 for adjustable attachment to the uprights 60 and 61 through the medium of bolts 88, the bars 85 and 86 being held at an upward angle of inclination so that their forward ends are above the main frame of the machine or engine. The forward ends of the bars 85 and 86 are connected by a cross-bar 89, and engaging this bar are adjustable screws 90 which are arranged on each side of the center of the bar and are supported from the cross bar or beam 27, the object of these screws being to hold the supplemental frame as a whole in its adjusted position and also to brace the same particularly in a downward direction. At the center of the cross bars 89 an eye bolt 91 is mounted therein having a lower eye 92 engaged by a hook rod 93 extending upwardly from the cross bar or beam 27. The object of this eye bolt 91 and hook rod 93 is to hold the supplemental frame in proper position relatively to the supports 60 and 61 and particularly to prevent upward springing movement of or to resist upward strain imposed on the said supplemental frame. When the pairs of end bars 85 and 86 are adjusted the adjusting bolts 90 and the hook rod will be correspondingly modified or shifted. Between the pairs of bars 85 and 86 near the outer cross bar 89 are pairs of inwardly projecting short or stub shafts 94 similar to the shafts 73, the shafts 94 being mounted in suitable bearings 95 carried by the end bars 85 and 86, and on these shafts guide sprocket wheels 96 and 97 are mounted in line with the sprocket wheels 74 and 75 and 78 and 79. The chain belts 76 and 77 are also trained over the sprocket wheels 96 and 97 as well as the lower sprocket wheels 78 and 79, the said sprocket wheels 96 and 97 being used to give the proper tension to the chain belts 76 and 77 by adjusting the supplemental frame carrying the said sprocket wheels 96 and 97 as hereinbefore explained. A clear or open space is formed between the pairs of sprocket wheels 74 and 75, 78 and 79 and 96 and 97, and transversely connecting the chain belts 76 and 77 is a cross rod or pin 98 which is preferably provided with an antifrictional roller 99, the cross pins and rollers 98 and 99 being engaged by the elongated loops 36 on the forward ends of the levers 32. Each pair of chain belts 76 and 77 is similarly provided with a cross pin 98 and roller 99 in different positions relatively to the lengths of the said chain belts to give the levers 32 an alternate up and down stroke or to elevate one lever and depress the other, and vice versa. The chain belts 76 and 77 are given a continuous movement from the sprocket wheels 78 and 79 and 83 and 84 by short chain belts 100 trained over the sprocket wheels 83 and 84 and also over sprocket wheels 101 in line with the sprocket wheels 83 and 84 on a shaft 102 held at its ends in suitable bearings 103 fixed to the free ends of rearwardly projecting arms 104 bolted to the opposite end of the lower cross-bar 63. The shaft 102 may be termed a motion distributing shaft, and on the center thereof are sprocket wheels 105 and 106 which have chain belts 107 and 108 respectively trained thereover and over sprocket wheels 109 and 110 provided with clutch sleeves 111 and 112 and loosely mounted on a motion transmitting shaft 113 held in suitable bearings 114 on the side beams 6 of the main frame just in rear and above the plane of the shaft 102. The shaft 113 has a pulley 115 on one end in line with the pulley 12 on the end of the shaft 11 of the prime motor 10, a belt 116 connecting the two pulleys 12 and 115 for transmitting power from the said motor to the shaft 113. The clutch members 111 and 112 of the sprocket wheels 109 and 110 are portions of the hubs of the latter wheels, and these hubs are held against longitudinal movement on the shaft 113 in outward directions by pins 117 extending through the shaft and engaging the hubs adjacent to the teeth of the clutch members, as shown by full and dotted lines in Fig. 6. The pins 117 do not, however, interfere with the loose rotatable mounting of the sprocket wheels 109 and 110 relatively to the shaft 113, but simply hold the said sprocket wheels against longitudinal movement on this shaft. Adjacent to the clutch members 111 and 112, clutch sleeves 118 and 119 are shiftably mounted on the shaft 113 and held in rotatable connection with the shaft through the medium of pins and slots 120 as in ordinary clutch sleeve structures. The outer ends of the clutch sleeves 118 and 119 are formed with grooves 121 for engagement with the yoked or grooved ends 122 of clutch levers 123 and 124, fulcrumed at their rear ends on the cross beam or bar 69. The clutch levers 123 and 124 have the opposite ends of a spring 125 connected thereto, said spring tending to draw the clutch levers toward each other. These clutch levers, however, are maintained in a predetermined spaced relation by a separating rod 126 having its ends loosely extending through the levers 123 and 124 and provided with stop pins 127 which are located in such position as to permit the clutch levers 123 and 124 to have slight lateral play. Secured at one end to one of the side beams 6 is a spring 128 which extends under the lower edge of the clutch lever 124 and is attached at its opposite end to the clutch lever 123, said spring 128 having considerable tension and when free to operate forces the clutch sleeve 118 inwardly into engagement with the clutch sleeve or member 111 of the sprocket wheel 109. A toggle lever 129 is also mounted to operate and control the actuation of the clutch levers 123 and 124, said toggle lever comprising a member 130 fulcrumed as at 131 on the adjacent side beam 6 of the frame 5 and a longer member 132 connected to the inner end of the member 130 by a break joint, as at 133, and having its opposite extremity reduced, as at 134, and loosely extending through an opening, as at 135, in the clutch lever 123. The reduced extremity 134 of the member 132 of the toggle lever has an impacting pin or projection 136 which is adapted to bear against the clutch lever 123 to throw the clutch sleeve 118 out of engagement with the clutch sleeve or member 111 of the sprocket wheel 109 when the two members of the toggle lever 129 are straightened or in longitudinal alinement, as shown by Fig. 6. The member 130 of the toggle lever 129 extends under the lower edge of the clutch lever 124 so as to clear the latter lever and operate directly on the clutch lever 123. A connecting rod 137 is attached to the joint 133 of the toggle lever 129 and extends rearwardly to an upright shifting lever 138 mounted on or adjacent to the beam 6 of the frame 5 opposite the position of the shifting lever 55, the shifting lever 138 having the usual locking means coöperating with a toothed segment 139 to maintain the adjustment of the rod 137. The mechanism just described is for varying the speed of the traction engine, the sprocket wheel 109 being greater in diameter than the sprocket wheel 110 and thereby providing for two different speeds. The clutch sleeve 119, which is normally in engagement with the clutch sleeve or member 112 of the sprocket wheel 110, is thrown out of engagement with relation to the sprocket sleeve or member 112 when the clutch sleeve 118 is free for automatic engagement with the clutch sleeve or member 111, as shown by Fig. 7. When the lifting lever 138 is in the position shown or vertically disposed the toggle lever 129 is straightened and the clutch sleeve 119 is then in engagement with the clutch sleeve 112 for high speed. Should a slower speed be desired the shifting lever 138 is drawn rearwardly, thereby breaking the joint 133 of the toggle lever 129 and drawing the members 130 and 132 to their rearmost maximum angle relatively to each other and relaxing the pressure of the impact pin or projection 136 relatively to the clutch lever 123 by drawing the reduced extremity 134 of the toggle lever member 132 in a direction inwardly between the two clutch levers 123 and 124 and immediately the tension of the spring 128 comes into play and draws on the clutch lever 123 and forces the clutch sleeve 118 into engagement with the clutch sleeve or member 111, and in view of the operation of the rod 126, which is caused to move outwardly with the clutch lever 123, the clutch sleeve 119 will be immediately disengaged from the clutch sleeve or member 112. This latter adjustment of the lever 138 gives the generator a normal operation or speed relatively to the motor 10, and when the said lever is drawn only partially rearward the joint 133 of the toggle lever 129 is broken, but the members 130 and 132 of said toggle lever are disposed at less rearward angles relatively to each other, and under these conditions both clutch sleeves 118 and 119 are disengaged from the clutch members 111 and 112 and under such conditions the generator mechanism is disengaged from the motor 10 and the latter may continue to operate without actuating the generator mechanism herein described. This disconnected position of the parts as just specified is clearly shown by Fig. 8. Should the teeth of either clutch sleeve 118 or 119 fail to exactly register and grip the teeth of the corresponding clutch sleeves or members 111 and 112, the spring 125 will then come into play and exert sufficient tension on the clutch lever needing this extra drawing action until there is a positive registration and jointure of either of the sets of clutch sleeves. The play given by the rod 126 relatively to the clutch levers 123 and 124 is only to such an extent as to insure full registration of the teeth of the clutch sleeves or members, and it will be understood that at the time either one of the clutch sleeves 118 or 119 fails to immediately set up a positive registration with its corresponding clutch sleeve or member, the clutch lever so affected will stand outwardly a slight distance on the end of the rod 126 or away from the adjacent pin 127. The spring 125, however, always operates to draw the clutch levers 123 and 124 into parallelism and the said clutch levers never move outwardly far enough relatively to the opposite ends of the rod 126 to become disengaged from the said rod.

The sprocket wheels 74, 75, 78, 79 and 83 and 84, together with the chain belts 76 and 77 held by the power increasing attachment or forming the essential elements of the latter, are uniformly driven from the shaft 102 through the connections hereinbefore explained relatively to the shaft 113 to actuate the levers 32 in alternation for operation of the ratchet wheels 30, the said levers 32 being the particular essentials or mediums for increasing power of the prime motor 10, and the strokes of the levers 32 may be varied by adjusting the frame comprising the uprights 60 and 61 and the cross bars 62 and 63 on the main frame of the machine in either a forward or backward direction. The chain belts 76 and 77 may be easily adjusted when they become too slack through the medium of the supplemental frame carrying the sprocket wheels 96 and 97. The operation of the chain belts 76 and 77 together with the sprocket wheels which they engage and the levers 32 is in all respects similar to the corresponding construction disclosed in my prior patent hereinbefore noted, the forward extremities of the levers 32 regularly traveling with and between the pairs of chain belts 76 and 77 and setting up a rocking action of said levers which is transmitted to the shoes 37 and by either set of pawls 39 or 40 to the ratchet wheels 30 in accordance with the adjustment of the said shoes.

From the foregoing it will be seen that the improved mechanism is positive in its driving action relatively to the axle 14 and traction wheels 15 and will be found exceptionally advantageous in its application to a traction engine as an increased power derived from a comparatively inexpensively operated motor.

In my patented structure the chain belt had exactly the same length to run on either side of its sprocket wheels, and in actual practice the levers following their respective belts in their circuits of movement were exactly at the top and bottom with each stroke of the said levers, and this gave a jerk to the power shaft in view of the fact that there was lost motion when the cross link was passing from one side to the other of its respective sprocket wheel and the one pawl did not have time to tighten against its ratchet wheel until after the remaining pawl had loosened its hold with respect to its ratchet wheel. To overcome this disadvantage the chain belts have been given a longer run at the front side of the frame by the additional pulleys 96 and 97 carried by the supplemental frame, as more clearly shown by Fig. 5; and the said chain belts 76 and 77 have their circuit equally divided between the levers 32 so that when the one lever has traversed its respective sprocket wheels, for instance 74 and 75, and has begun its descent, the remaining lever 32 has not completed its traversing movement relatively to the lower sprocket wheels on the opposite side; and in view of this operation the one shoe 37 is actuated to bring the upper pawl or dog 39 against the teeth of its ratchet wheel 30 before the remaining shoe 37 releases its hold at the bottom relatively to its ratchet wheel 30. This operation is effected during the forward movement of the tractor. The sprocket wheels 96 and 97 also serve as belt tighteners as hereinbefore explained, but the most advantageous result of the generator mechanism with the chain belts 76 and 77 as arranged in the present instance is that a steady rotation of the power shaft during the forward movement of the tractor is obtained. The improved mechanism permits a prime motor of a comparatively low power to be used and the power of such motor increased and rendered practical in propelling a traction engine at a materially reduced cost. The improved traction engine as hereinbefore explained may be used similarly to other forms of traction engines, and it will be seen that in many structural particulars the improved engine or machine is not nearly so cumbersome as the ordinary form of traction engine, yet is sufficiently strong and durable to adapt the same to all sorts of work where a traction engine may be used for drawing or propelling machinery or in transporting loads carried in trucks or trailers.

What is claimed is:

1. In a mechanism of the class specified for operating a traction engine, the combination of a main frame, a prime motor mounted on the frame, a drive axle having traction wheels and ratchet wheels on opposite extremities thereof, a frame adjustably mounted on the front extremity of the main frame and extending above and below the latter and embodying upper and lower pairs of shafts with sprocket wheels thereon and having pairs of chain belts trained thereover, a part of the shafts and sprocket wheels being held by the lower portion of this adjustable frame below the main frame, the chain belts of each pair being spaced and connected at different points, means between the prime motor and the said chain belts for operating the latter, and power increasing levers fulcrumed on the axle and having a loose engagement with the connections of the chain belts and alternately reciprocated by the latter in reverse directions, the levers carrying at their rear ends beyond the axles intermediately fulcrumed shoes with upper and lower pawls to engage the ratchet wheels on the axle.

2. In a mechanism of the class specified for operating a traction engine, the combination of a main frame having an axle with traction wheels and ratchet wheels on opposite extremities thereof, a prime motor mounted on the frame, reciprocating levers fulcrumed on the axle and carrying trunnion shoes provided with upper and lower pivoted pawls to engage the ratchet wheels and rotate the latter in opposite directions, the pawls being movable independently of the shoes, mechanism connected to the prime motor for alternately reciprocating the said levers, and means for adjusting the shoes carrying the pawls.

3. In a mechanism of the class specified for operating traction engines, the combination of a main frame provided with an axle having traction and ratchet wheels thereon, a prime motor on the main frame, mechanism adjustably held on the front extremity of the main frame and comprising opposite pairs of chain belts, each pair of chain belts having connecting means and the two pairs of belts being in different positions, connecting devices between the chain belts and the prime motor for operating the said belts, tensioning means for the chain belts, portions of the chain belts extending below the main frame and shiftable with the said mechanism in forward and rearward directions relatively to the main frame, means for changing the speed of the chain belts, and levers fulcrumed on the axle and having their forward extremities engaging the connections of the chain belts and reciprocated in opposite directions by said belts, the rear extremities of the levers having swinging shoes mounted therein and provided with upper and lower pivoted pawls to engage the ratchet wheels.

4. In a mechanism of the class specified for operating traction engines, the combination of a main frame provided with an axle having traction and ratchet wheels thereon, a prime motor mounted on the frame, an adjustable frame mounted on the front extremity of the main frame and projecting above and below the latter and provided with shafts at the upper and lower portions of opposite sides thereof, a part of the shafts being below the main frame and shiftable with the adjustable frame in forward and rearward directions, the said shafts having sprocket wheels on the inner and outer ends thereof and in alinement, chain belts trained over said sprocket wheels, cross shafts mounted in a portion of said supports in alinement with the first named shafts and having terminal sprocket wheels spaced from the inner sprocket wheels of the latter shafts, chain belts engaging the latter sprocket wheels, mechanism between the prime motor and a portion of said shafts and sprocket wheels and operating all the sprocket wheels and belts at a uniform speed, levers connected at one end of each to different parts of the inner chain belts of the pairs of shafts, mechanism for varying the speed of the said sprocket wheels and pairs of chain belts, and adjustable means carried by the rear ends of the levers to engage the ratchet wheels and operative to impart a reverse movement to the latter and to the axle.

5. In a mechanism of the class specified for operating traction engines, the combination of a main frame provided with an axle having traction and ratchet wheels thereon, a prime motor mounted on the main frame, a frame fulcrumed on the front extremity of the main frame and projecting partially above and below the latter, the said fulcrumed frame having shafts bearing therein and provided with sprocket wheels engaged by chain belts in part arranged in pairs adjacent to each other with clear spaces between them, a part of the shafts carried by the fulcrumed frame being below the main frame and movable with the said fulcrumed frame in forward and rearward directions below the main frame, means between the said prime motor and shafts for regularly and continuously driving the shafts, sprocket wheels and chain belts, mechanism for modifying the speed of the shafts, sprocket wheels and chain belts, levers connected to transversely opposite portions of the adjacent pairs of chain belts at different points relatively to the pairs of belts, said levers being fulcrumed on the axle, swinging shoes carried by the rear extremities of the levers and having upper and lower pivoted pawls to engage the ratchet wheels, and resilient means connected to the shoes to hold the pawls in engagement with the ratchet wheels.

6. In a mechanism of the class specified for operating a traction engine, the combination of a main frame having an axle provided with traction and ratchet wheels on opposite extremities thereof, a prime motor mounted on the main frame, a frame adjustably mounted on the forward extremity of the main frame and comprising supports having shafts bearing therein and located above and below the main frame and provided with sprocket wheels engaged by chain belts in part arranged in pairs adjacent to each other with clear spaces between them, the adjustable frame with its shafts, sprocket wheels and chain belts being shiftable in forward and rearward directions relatively to the main frame, means between said prime motor and shafts for regularly and continuously driving the said shafts, sprocket wheels and chain belts, reciprocating levers fulcrumed on the axle and having a loose connection at their front ends with the pairs of chain belts, and swinging shoes carried by the rear extremities of the levers and having upper and lower pawls to engage the ratchet wheels.

7. In a mechanism of the class specified for operating a traction engine, the combination of a main frame having an axle with traction and ratchet wheels thereon, sprocket wheels and shafts supported at the forward extremity of the main frame and operatively connected to the prime motor, a portion of the sprocket wheels being engaged by chain belts arranged in pairs adjacent to each other with clear spaces between them, a part of the shafts and sprocket wheels and the chain belts being both above and below the main frame and shiftable in forward and rearward directions relatively to the said main frame, means connecting the pairs of chain belts, the connections of the distinct pairs of chain belts being in different positions, and levers fulcrumed on the axle and having the forward ends loosely engaging the connections of the pairs of chain belts and moving with the chain belts in the clear spaces between the latter, the rear extremities of the said levers being provided with means to engage the ratchet wheels and adjustable to reverse the movement of said wheels.

8. In a mechanism of the class specified for operating a traction engine, the combination of a main frame having an axle with traction and ratchet wheels thereon, a prime motor on the frame, mechanism mounted on the front extremity of the main frame and including pairs of chain belts at opposite sides with clear spaces between them and movable above and below the said frame, a part of the said mechanism being both above and below the main frame and shiftable in forward and rearward directions relatively to the main frame, means between the prime motor and the chain belts for operating the latter, and levers fulcrumed on the axle and individually engaging the pairs of chain belts at their front extremities and having adjustable upper and lower pawls at their rear extremities to coöperate with the ratchet wheels, the adjustment of the pawls relatively to the ratchet wheels operating the latter in reverse directions with increased power through the medium of the said levers.

9. In a mechanism of the class specified for operating a traction engine, the combination of a main frame having an axle with traction wheels and ratchet wheels on opposite extremities thereof, a prime motor mounted on the frame, reciprocating levers fulcrumed on the axle and carrying means to engage the ratchet wheels for operating the latter, a frame adjustably mounted on the front extremity of the main frame and embodying upper and lower pairs of shafts with sprocket wheels thereon and having pairs of chain belts trained thereover, the reciprocating levers having their forward extremities engaging portions of the chain belts, and a tension frame projecting from the said adjustable frame and carrying sprocket wheels engaged by the said chain belts, the tension frame being shiftable relatively to the said adjustable frame.

10. In a mechanism of the class specified for operating a traction engine, the combination of a main frame having an axle with traction wheels and ratchet wheels on opposite extremities thereof, a prime motor mounted on the frame, reciprocating levers fulcrumed on the axle and carrying means to engage the ratchet wheels for operating the latter, a frame adjustably mounted on the front extremity of the main frame and embodying upper and lower pairs of shafts with sprocket wheels thereon and having pairs of chain belts trained thereover, the reciprocating levers having their forward extremities engaging portions of the chain belts, a tension frame projecting from the said adjustable frame and carrying sprocket wheels engaged by the said chain belts, the tension frame being shiftable relatively to the said adjustable frame, and connecting means between a part of the tension frame and the main frame to hold the tension frame in proper position relatively to the adjustable frame.

11. In a mechanism of the class specified for operating a traction engine, the combination of a main frame having an axle with traction wheels and ratchet wheels on opposite extremities thereof, a prime motor mounted on the frame, reciprocating levers fulcrumed on the axle and carrying means to engage and operate the said ratchet wheels, an adjustable frame mounted on the front extremity of the main frame and extending above and below the latter and provided with a supplemental tension frame extending forwardly therefrom, the adjustable frame embodying upper and lower pairs of shafts with sprocket wheels thereon and also having pairs of chain belts trained over the sprocket wheels, the supplemental tension frame being also provided with sprocket wheels engaged by the said chain belts, the reciprocating levers being connected to the chain belts, adjustable screws arranged on each side of the center of the forward member of the supplemental frame to brace the latter frame in a downward direction and to hold the said frame in its adjusted position, connecting means between the forward member of the supplemental frame and the main frame, and means for holding the adjustable frame carrying the supplemental frame in proper position relatively to the main frame.

12. In a mechanism of the class specified for operating a traction engine, the combination of a main frame having an axle with traction wheels and ratchet wheels on opposite extremities thereof, a prime motor mounted on the frame, reciprocating levers fulcrumed on the axle and having means to operatively engage the ratchet wheels and rotate the latter in opposite directions, mechanism connected to the prime motor for alternately reciprocating the said levers, and a motion transmitting shaft operatively connected to the said mechanism and to the prime motor, the connecting means for the transmitting shaft relatively to the mechanism being in the form of sprocket wheels having clutch hubs together with chain belts engaging said sprocket wheels, shiftable clutch members on the motion transmitting shaft to engage the clutch hubs of the sprocket wheels, fulcrumed clutch levers having extremities engaging the clutch members to shift the latter inwardly and outwardly, a spring connecting the said clutch levers and tending to draw the latter toward each other, a separating rod having its ends loosely engaging the clutch levers, a spring connected to one of the clutch levers and to the main frame, a toggle lever fulcrumed at one end on a part of the main frame and having one extremity and a stop means engaging one of the clutch levers, and means for operating the said toggle lever to change the position of the parts thereof and modify the clutch members relatively to the clutch hubs of the sprocket wheels.

In testimony whereof I have hereunto set my hand in presence of two subscribing witnesses.

CLARENCE B. WILLIAMS.

Witnesses:
GORDON BROOKS,
PEARL BROOKS.

Copies of this patent may be obtained for five cents each, by addressing the "Commissioner of Patents, Washington, D. C."